(12) United States Patent
Li et al.

(10) Patent No.: US 11,198,184 B2
(45) Date of Patent: Dec. 14, 2021

(54) DRILL CHUCK

(71) Applicant: SHANDONG WEIDA MACHINERY CO., LTD., Shandong (CN)

(72) Inventors: Yanzhao Li, Shandong (CN); Ningbo Wei, Shandong (CN); Cong Liu, Shandong (CN)

(73) Assignee: SHANDONG WEIDA MACHINERY CO., LTD., Shandong (CN)

( * ) Notice: Subject to any disclaimer, the term of this patent is extended or adjusted under 35 U.S.C. 154(b) by 0 days.

(21) Appl. No.: 17/057,117

(22) PCT Filed: Dec. 4, 2018

(86) PCT No.: PCT/CN2018/119089
§ 371 (c)(1),
(2) Date: Nov. 20, 2020

(87) PCT Pub. No.: WO2020/000905
PCT Pub. Date: Jan. 2, 2020

(65) Prior Publication Data
US 2021/0197292 A1    Jul. 1, 2021

(30) Foreign Application Priority Data

Jun. 28, 2018 (CN) .......................... 201821018291.7
Jun. 28, 2018 (CN) .......................... 201821018293.6

(51) Int. Cl.
*B23B 31/12* (2006.01)
(52) U.S. Cl.
CPC ........ *B23B 31/1238* (2013.01); *B23B 31/123* (2013.01); *B23B 31/1215* (2013.01)
(58) Field of Classification Search
CPC .............. B23B 31/123; B23B 31/1238; B23B 2231/38; B23B 31/1215; Y10T 279/17632; Y10T 279/32; Y10S 279/602
See application file for complete search history.

(56) References Cited

U.S. PATENT DOCUMENTS 7,431,308 B2 * 10/2008 Cachod ................. B23B 31/123
                                                   279/125
7,527,273 B2 *  5/2009 Bordeianu ............ B23B 31/123
                                                   279/140
(Continued)

FOREIGN PATENT DOCUMENTS

CN       101066564 A    11/2007
CN       201776466 U     3/2011
(Continued)

OTHER PUBLICATIONS

Machined Translation, WO 2008/009171 A1, Hu et al. (Year: 2008).*

*Primary Examiner* — Eric A. Gates
*Assistant Examiner* — Chwen-Wei Su
(74) *Attorney, Agent, or Firm* — Gang Yu

(57) ABSTRACT

Some embodiments of the present disclosure provide a drill chuck. The drill chuck includes: a drill body; jaws, partially disposed in the drill body, external threads being provided on an outer wall of the jaws; a locking member, disposed on the outer side of the drill body, the locking member being provided with internal threads, the locking member and the jaws being in threaded fit to enable the jaws to be movably disposed in the drill body; a driving assembly, disposed on an outer side of the locking member, the driving assembly being configured to drive the locking member to rotate, the driving assembly being disposed between a housing and the locking member, the housing driving the locking member to rotate by the driving assembly to enable the jaws to move in the drill body; and a locking structure, located between the housing and the jaws.

11 Claims, 15 Drawing Sheets

(56) References Cited

U.S. PATENT DOCUMENTS

2014/0265163 A1    9/2014  Mason
2015/0130144 A1*   5/2015  Schenk ............... B23B 31/1238
                                                           279/62
2015/0266103 A1    9/2015  Young et al.

FOREIGN PATENT DOCUMENTS

CN        206200161 U      5/2017
CN        207534028 U      6/2018
WO    WO-2008009171 A1 *   1/2008  ........... B23B 31/123

* cited by examiner

DRILL CHUCK

CROSS-REFERENCE TO RELATED APPLICATIONS

The present disclosure is a national stage application of International Patent Application No. PCT/CN2018/119089, which is filed on Dec. 4, 2018, and claims priority to Chinese Patent Application No. 201821018291.7, filed on Jun. 28, 2018 and Chinese Patent Application No. 201821018293.6, filed on June 28, and entitled "Drill Chuck", the contents of which are hereby incorporated by reference in its entirety.

TECHNICAL FIELD

The disclosure relates to a technical field of drill chucks, and more particularly to a drill chuck.

BACKGROUND

At present, a drill chuck in an art known to inventors prevents a jaw from loosening when the drill chuck is drilling, so as to ensure that the drill chuck works normally. However, a use of this drill chuck in an actual use process causes the jaw to become tighter and tighter. When a certain level is reached, the jaw cannot be loosened by hand, and it is inconvenient to replace a drill bit of the drill chuck. That is, a self-locking problem of the drill chuck is caused. Therefore, when the drill chuck in the art known to inventors is used for automatic locking, it will not be convenient for operators to use.

SUMMARY

Some embodiments of the disclosure provide a drill chuck to solve a problem of self-locking or loosening of a drill chuck in an art known to inventors during drilling.

Some embodiments of the disclosure provide a drill chuck. The drill chuck includes: a drill body; jaws, partially disposed in the drill body, the jaws being movably disposed in the drill body to realize clamping and unclamping, and external threads being provided on an outer wall of the jaws; a locking member, disposed on the outer side of the drill body, the locking member being provided with internal threads, and the locking member and the jaws being in threaded fit to enable the jaws to be movably disposed in the drill body; a driving assembly, disposed on an outer side of the locking member, the driving assembly being configured to drive the locking member to rotate; a housing, the drill body, the jaws, the locking member and the driving assembly being disposed in the housing, the driving assembly being disposed between the housing and the locking member, and the housing driving the locking member to rotate by means of the driving assembly to enable the jaws to move in the drill body; and a locking structure, disposed in the housing, the locking structure being located between the housing and the jaws, the locking structure having a locking state and an avoiding state, when the locking structure is in the locking state, the locking structure being configured to restrict the driving assembly from driving the jaws to move so as to prevent the jaws from further clamping or unclamping.

In some embodiments, the locking structure includes a toothed structure and a clamping structure, the clamping structure is disposed on the driving assembly, the clamping structure has a first locking position and a first avoiding position, when the locking structure is in the locking state, the clamping structure is at the first locking position to cooperate with the toothed structure to restrict the driving assembly to rotate, and when the locking structure is in the avoiding state, the clamping structure is at the first avoiding position to enable the driving assembly to smoothly drive the locking member to rotate.

In some embodiments, the locking structure further includes a protruding portion and a clamping portion, the protruding portion is disposed on the driving assembly, the protruding portion and the clamping structure are spaced from each other, the protruding portion has a second locking position and a second avoiding position, when the locking structure is in the locking state, the protruding portion is at the second locking position to cooperate with the clamping portion to restrict the driving assembly to rotate, and when the locking structure is in the avoiding state, the protruding portion is at the second avoiding position to enable the driving assembly to smoothly drive the locking member to rotate.

In some embodiments, the toothed structure includes a first toothed structure, the first toothed structure includes a plurality of first toothed units, the first toothed unit includes a first tooth and a second tooth, the first tooth has a first inclined surface and a second inclined surface, the second tooth has a third inclined surface and a fourth inclined surface, the first inclined surface, the second inclined surface, the third inclined surface and the fourth inclined surface are connected in sequence, and a length of the fourth inclined surface is greater than a length of the second inclined surface.

In some embodiments, the toothed structure includes a second toothed structure, and the second toothed structure includes a plurality of third teeth, a gap is disposed between two adjacent third teeth.

In some embodiments, a pitch of a thread of jaws fitting the locking member is T, and a number of teeth of the toothed structure is Z, $0.021 < T/Z \le 0.03$.

In some embodiments, the toothed structure is an external toothed structure, and the toothed structure is disposed on an outer wall of the drill body.

In some embodiments, the driving assembly includes: a sleeve, disposed in the housing, the sleeve being sleeved on the outer side of the locking member, and the locking member and the sleeve being in interference fit; and an elastic member, disposed in the sleeve, a part of the elastic member being passed through the sleeve and abutted against an inner wall of the housing, the elastic member being provided with the clamping structure, and the housing driving the locking member to rotate by the sleeve.

In some embodiments, an inner wall of the housing is provided with a first groove, a second groove, a third groove, and a fourth groove sequentially disposed in a circumferential direction, the first groove is connected with the second groove in a manner of a circular arc, a groove depth of the second groove is less than a groove depth of the first groove, the third groove and the fourth groove are spaced from each other, the sleeve is provided with a first through hole and a second through hole, the elastic member has a first protrusion, a second protrusion and a backstop piece, the first protrusion is disposed in the first through hole, the second protrusion is disposed in the second through hole, the backstop piece forms the clamping structure, when the first protrusion is disposed in the second groove and the second protrusion is disposed in the fourth groove, the clamping structure is at the first locking position, and when the first protrusion is disposed in the first groove and the second protrusion is disposed in the third groove, the clamping structure is at the first avoiding position.

In some embodiments, the protruding portion is disposed on the sleeve, the clamping portion includes a clamping groove, the clamping groove is provided on the inner wall of the housing, the inner wall of the housing is also provided with an avoiding groove, the avoiding groove and the clamping groove are spaced from each other along an axial direction, when the clamping structure is at the first locking position, the protruding portion is abutted against a groove wall of the clamping groove so that the protruding portion is at the second locking position, and when the clamping structure is at the first avoiding position, the protruding portion is located in the avoiding groove so that the protruding portion is at the second avoiding position.

By adopting the technical solution of some embodiments in the present disclosure, a locking structure is disposed between a housing and jaws, and when the locking structure is in a locking state, the locking structure is configured to restrict the housing from driving the jaws to move by the driving assembly to prevent the jaws from further clamping or unclamping. In this way, the jaws of the drill chuck are prevented from loosening during drilling, and the jaws of the drill chuck are prevented from being clamped tightly during the drilling. Therefore, by adopting the technical solution of some embodiments in the present disclosure, a technical problem of self-locking or loosening of the drill chuck in the art known to inventors during drilling is solved.

BRIEF DESCRIPTION OF THE DRAWINGS

The accompanying drawings, which constitute a part of this application, are used to provide a further understanding of the disclosure, and the exemplary embodiments of the disclosure and the description thereof are used to explain the disclosure, but do not constitute improper limitations to the disclosure. In the drawings.

The drawings include the following reference signs:
10, drill body; 20, jaw; 30, locking member; 40, housing; 41, first groove; 42, second groove; 43, third groove; 44, fourth groove; 45, avoiding groove; 46, clamping groove; 51, first toothed structure; 52, second toothed structure; 61, sleeve; 611, protruding portion; 62, elastic member; 621, first protrusion; 622, second protrusion; 623, backstop piece; 70, supporting member; 80, bearing; 90, rear cover; 100, front cover; 110, clamp spring.

DETAILED DESCRIPTION OF THE EMBODIMENTS

The technical solutions in the embodiments of the disclosure will be clearly and completely described hereinbelow with the drawings in the embodiments of the disclosure. It is apparent that the described embodiments are only part of the embodiments of the disclosure, not all of the embodiments. The following description of at least one exemplary embodiment is only illustrative actually, and is not used as any limitation for the disclosure and the application or use thereof. On the basis of the embodiments of the disclosure, all other embodiments obtained on the premise of no creative work of those of ordinary skill in the art fall within the scope of protection of the disclosure.

Figure 1:
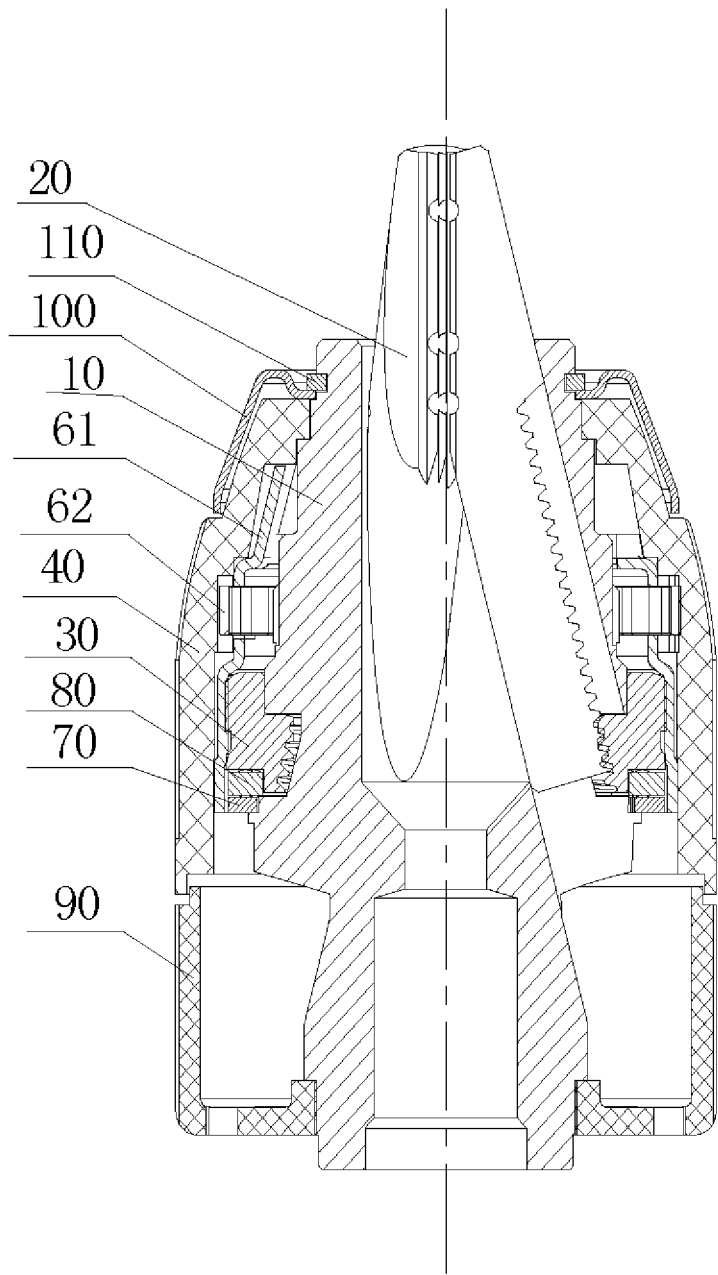
FIG. 1 illustrates a schematic structure diagram of a drill chuck according to some embodiments in the present disclosure.

As shown in FIG. 1, some embodiments of the present disclosure provide a drill chuck. The drill chuck includes a drill body 10, jaws 20, a locking member 30, a driving assembly, a housing 40, and a locking structure. The jaws 20 is partially disposed in the drill body 10, the jaws 20 is movably disposed in the drill body 10 to realize clamping and unclamping, and external threads are provided on an outer wall of the jaws 20. The locking member 30 is disposed on an outer side of the drill body 10, the locking member 30 is provided with internal threads, and the locking member 30 and the jaws 20 are in threaded fit to enable the jaws 20 to be movably disposed in the drill body 10. The driving assembly is disposed on the outer side of the locking member 30, and the driving assembly is configured to drive the locking member 30 to rotate. The drill body 10, the jaws 20, the locking member 30 and the driving assembly are disposed in the housing 40, the driving assembly is disposed between the housing 40 and the locking member 30, and the housing 40 drives the locking member 30 to rotate by the driving assembly to enable the jaws 20 to move in the drill body 10. The locking structure is disposed in the housing 40, the locking structure is located between the housing 40 and the jaws 20, the locking structure has a locking state and an avoiding state, and when the locking structure is in the locking state, the locking structure is configured to restrict the driving assembly from driving the jaws 20 to move so as to prevent the jaws 20 from further clamping or unclamping. The locking member 30 of some embodiments in the present disclosure is a nut.

By adopting the drill chuck provided by the present embodiments, a locking structure is disposed between a housing 40 and jaws 20, and when the locking structure is in a locking state, the locking structure is configured to restrict the housing 40 from driving the jaws 20 to move by the driving assembly to prevent the jaws 20 from further clamping or unclamping. In this way, the jaws 20 of the drill chuck are prevented from loosening during drilling, and the jaws 20 of the drill chuck are prevented from being clamped tightly during the drilling. Therefore, by adopting the technical solution of some embodiments in the present disclosure, a technical problem of self-locking or loosening of the drill chuck in the art known to inventors during drilling is solved.

In some embodiments, the locking structure further includes a protruding portion 611 and a clamping portion, the protruding portion 611 is disposed on the driving assembly, the protruding portion 611 and the clamping structure are spaced from each other, the protruding portion 611 has a second locking position and a second avoiding position, when the locking structure is in the locking state, the protruding portion 611 is at the second locking position to cooperate with the clamping portion to restrict the driving assembly to rotate, and when the locking structure is in the avoiding state, the protruding portion 611 is at the second avoiding position to enable the driving assembly to smoothly drive the locking member 30 to rotate. With this arrangement, the unlocking torque is increased by providing the protruding portion 611 and the clamping portion, which effectively achieves the anti-loosening effect and prevents the drill chuck from loosening during drilling.

Figure 20:
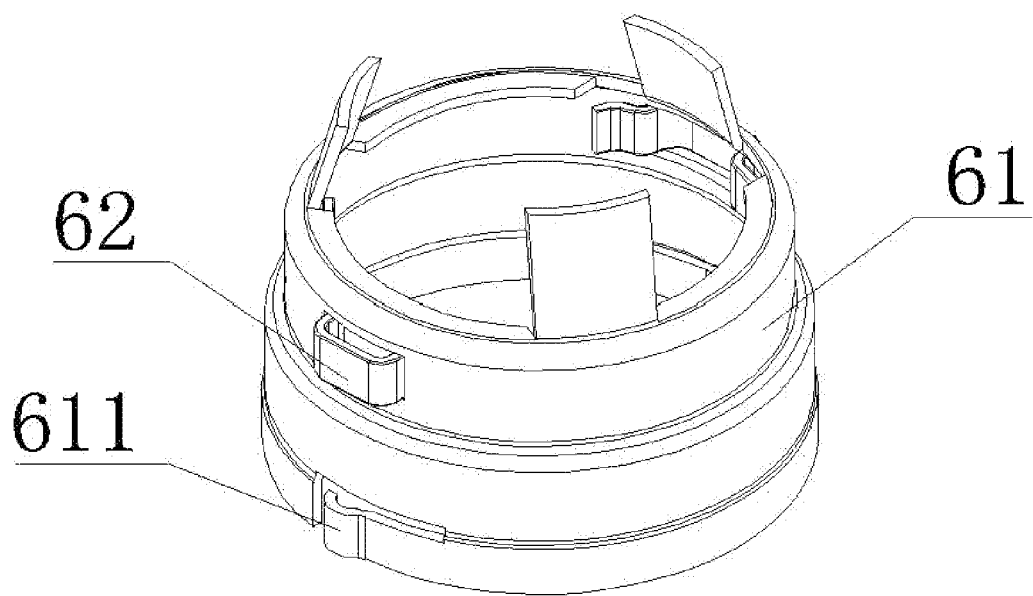
FIG. 20 illustrates a schematic structure diagram of a sleeve having a protruding portion according to some embodiments in the present disclosure.
Figure 21:
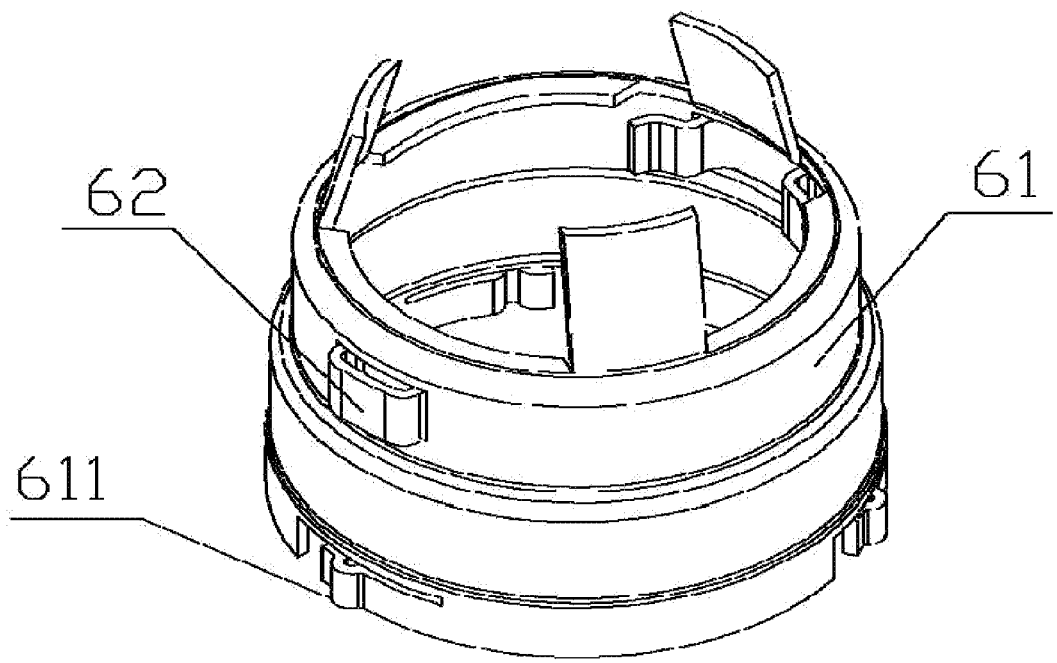
FIG. 21 illustrates a schematic structure diagram of a sleeve having a plurality of protruding portions according to some embodiments in the present disclosure.
Figure 22:
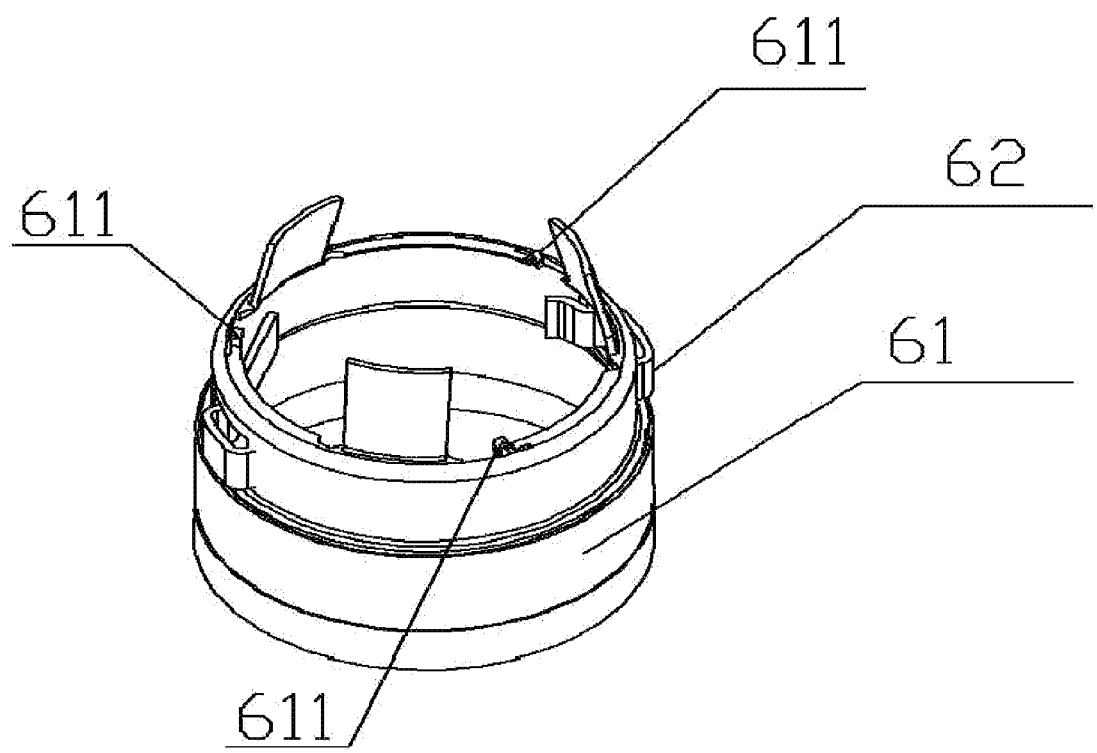
FIG. 22 illustrates a schematic structure diagram of a protruding portion and a clamping structure spaced from each other along an axial direction of a sleeve according to some embodiments in the present disclosure.
Figure 23:
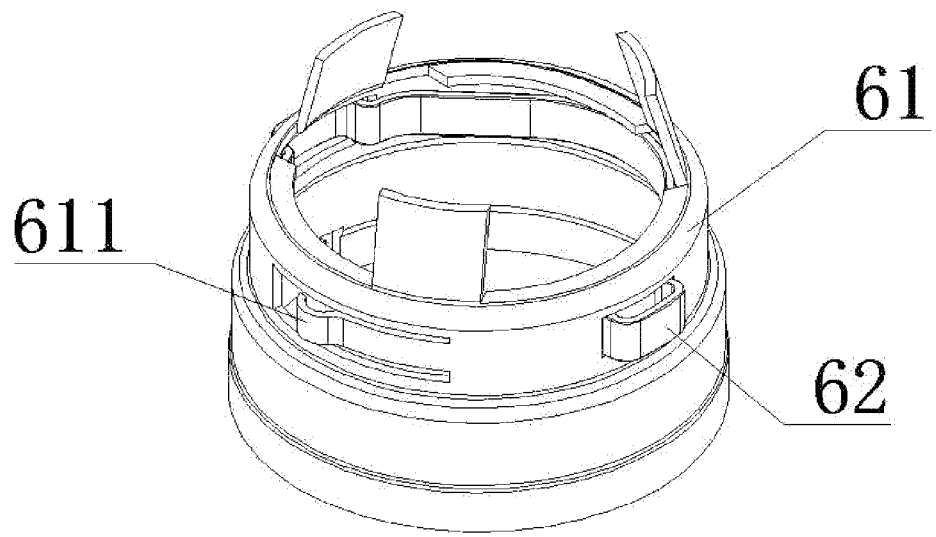
FIG. 23 illustrates a schematic structure diagram of a protruding portion and a clamping structure spaced from each other along a circumferential direction of a sleeve according to some embodiments in the present disclosure.
Figure 24:
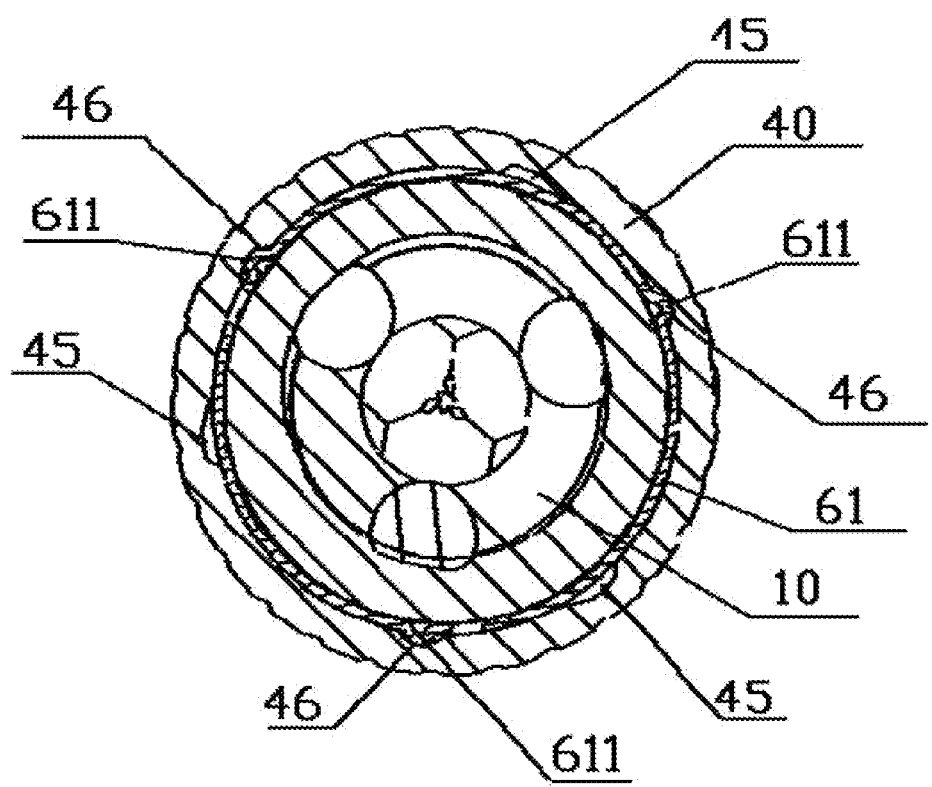
FIG. 24 illustrates a schematic structure diagram of a protruding portion at a second locking position according to some embodiments in the present disclosure.
Figure 25:
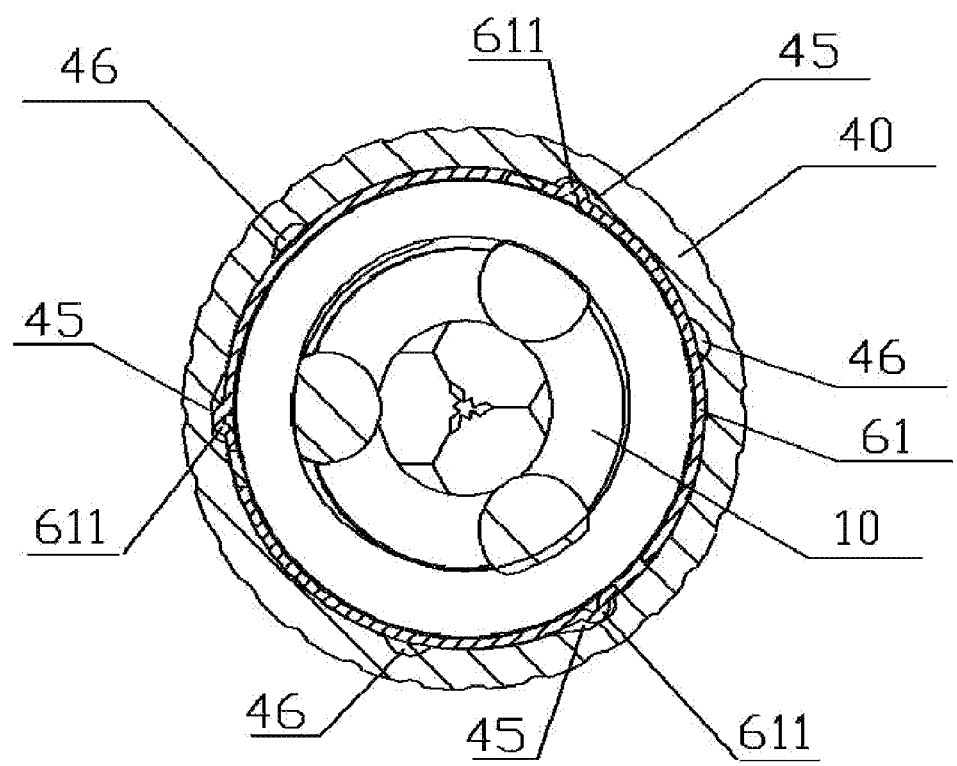
FIG. 25 illustrates a schematic structure diagram of a protruding portion at a second avoiding position according to some embodiments in the present disclosure.
Figure 26:
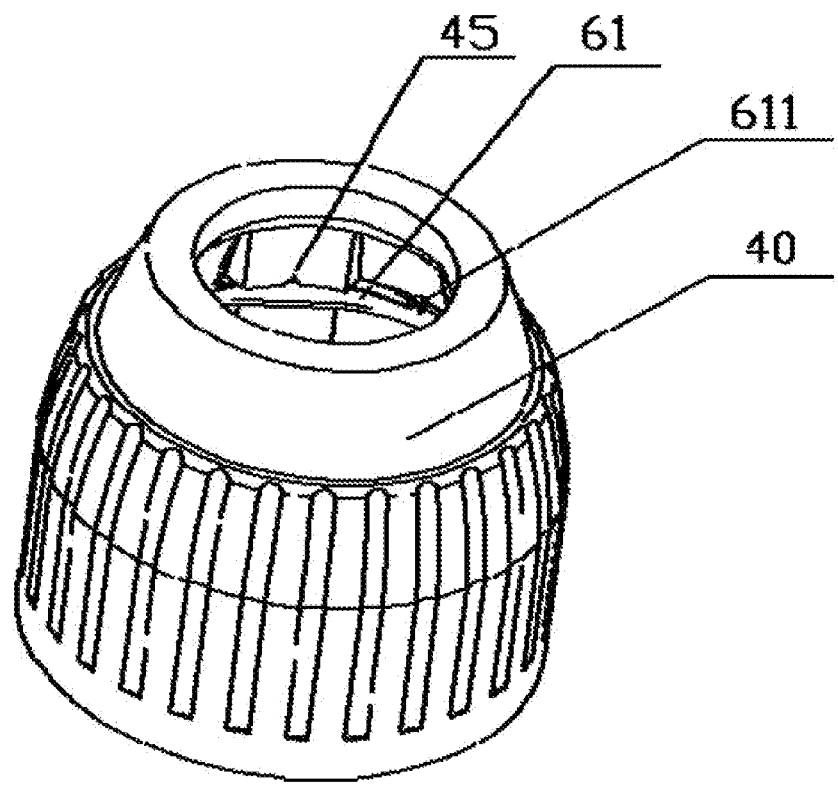
FIG. 26 illustrates a side view of a sleeve having a protruding portion according to some embodiments in the present disclosure.
Figure 27:
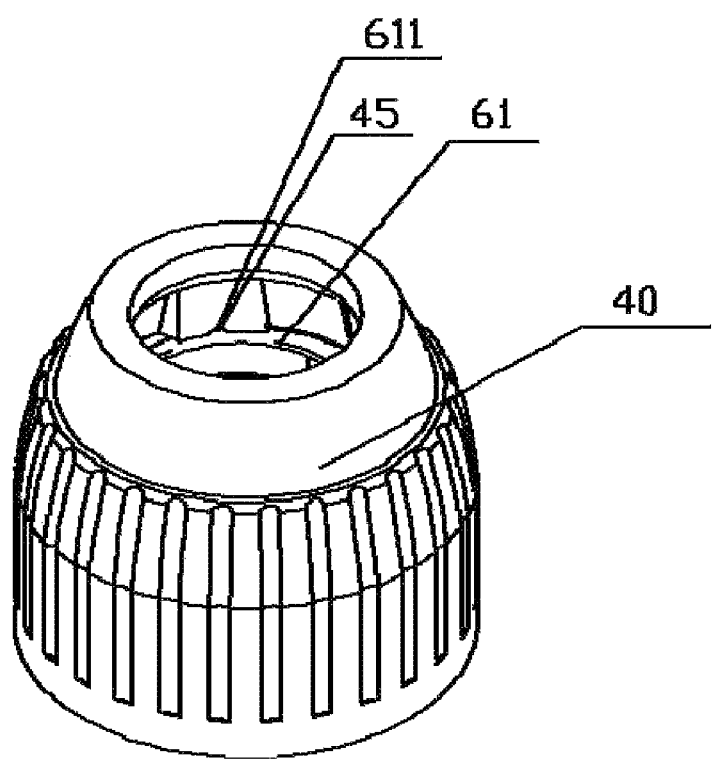
FIG. 27 illustrates a schematic structure diagram of the protruding portion in FIG. 26 at a second avoiding position.

As shown in FIG. 20, FIG. 21 and FIG. 22, the protruding portion 611 and the clamping structure are spaced from each other in an axial direction. As shown in FIG. 23, the protruding portion 611 and the clamping structure are spaced from each other in a radial direction.

In some embodiments, the locking structure includes a toothed structure and a clamping structure, the clamping structure is disposed on the driving assembly, and the clamping structure has a first locking position and a first avoiding position. When the locking structure is in the locking state, the clamping structure is at the first locking position to cooperate with the toothed structure to restrict the driving assembly to rotate. When the locking structure is in the avoiding state, the clamping structure is at the first avoiding position to enable the driving assembly to smoothly drive the locking member 30 to rotate.

In some embodiments, the toothed structure includes a first toothed structure 51, the first toothed structure 51 includes a plurality of first toothed units, the first toothed unit includes a first tooth and a second tooth, the first tooth has a first inclined surface and a second inclined surface, the second tooth has a third inclined surface and a fourth inclined surface, the first inclined surface, the second inclined surface, the third inclined surface and the fourth inclined surface are connected in sequence, and a length of the fourth inclined surface is greater than a length of the second inclined surface. Both the first inclined surface and the third inclined surface are configured to prevent the jaws 20 from loosening, and the second inclined surface and the fourth inclined surface are both configured to prevent the jaws 20 from self-locking.

In some embodiments, the second inclined surface and the fourth inclined surface of corresponding lengths are disposed according to actual working conditions, so that the toothed structure has a good effect of preventing self-locking. With this arrangement, the drill chuck provided in the present embodiments is used, and when the drill chuck works under low-strength vibration, the clamping structure can not cross the second inclined plane, so that self-locking phenomenon is not occur. When a working strength of the drill chuck reaches a certain value, the clamping structure crosses the second inclined plane, but does not cross the fourth inclined plane, so that the self-locking phenomenon does not occur.

In some embodiments, the toothed structure includes a second toothed structure 52, and the second toothed structure 52 includes a plurality of third teeth, a gap is disposed between two adjacent third teeth. With this arrangement, the clamping structure is cooperated with a gap disposed between two adjacent third teeth, which prevents the jaws 20 from loosening and prevents the jaw 20 from self-locking.

Figure 2:
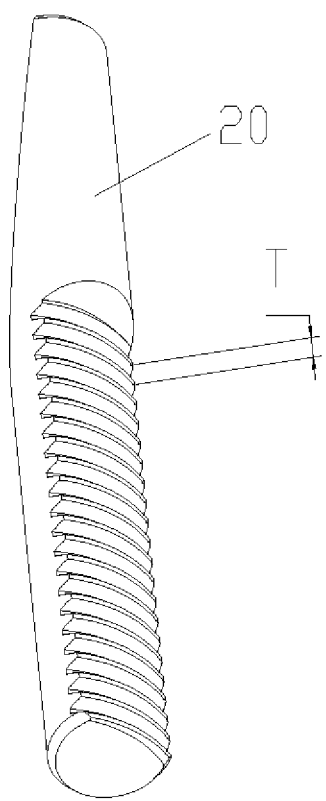
FIG. 2 illustrates a schematic structure diagram of a jaw according to some embodiments in the present disclosure.
Figure 3:
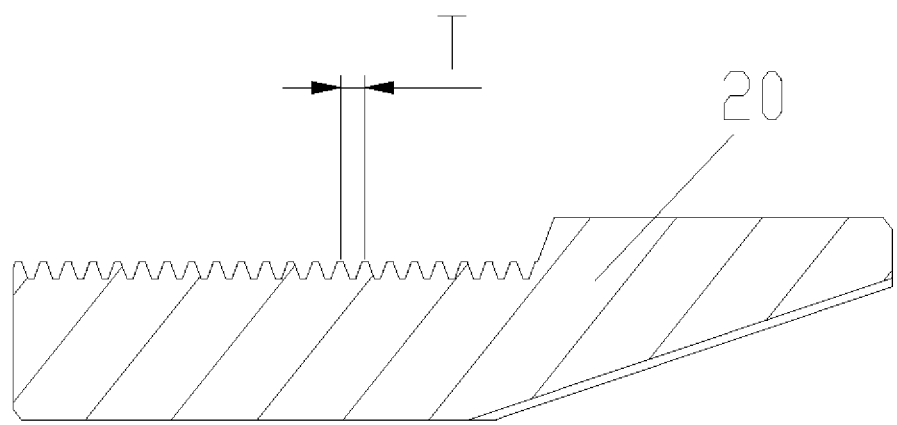
FIG. 3 illustrates a front view of a jaw according to some embodiments in the present disclosure.
Figure 4:
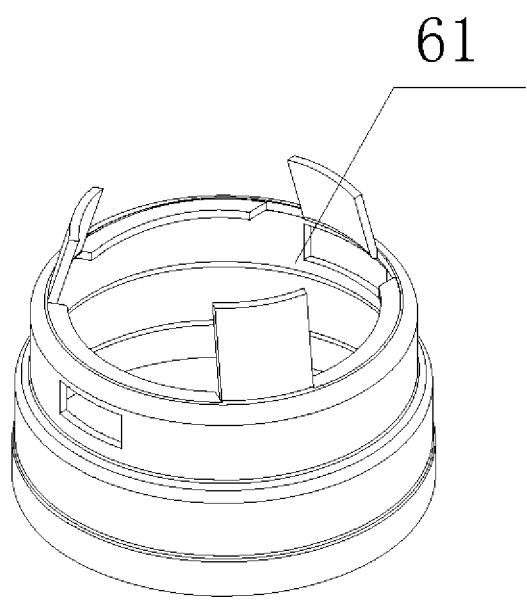
FIG. 4 illustrates a schematic structure diagram of a sleeve according to some embodiments in the present disclosure.
Figure 5:
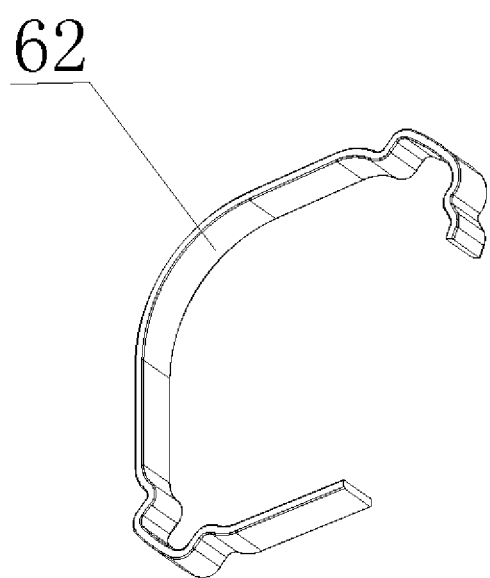
FIG. 5 illustrates a schematic structure diagram of an elastic member according to some embodiments in the present disclosure.
Figure 6:
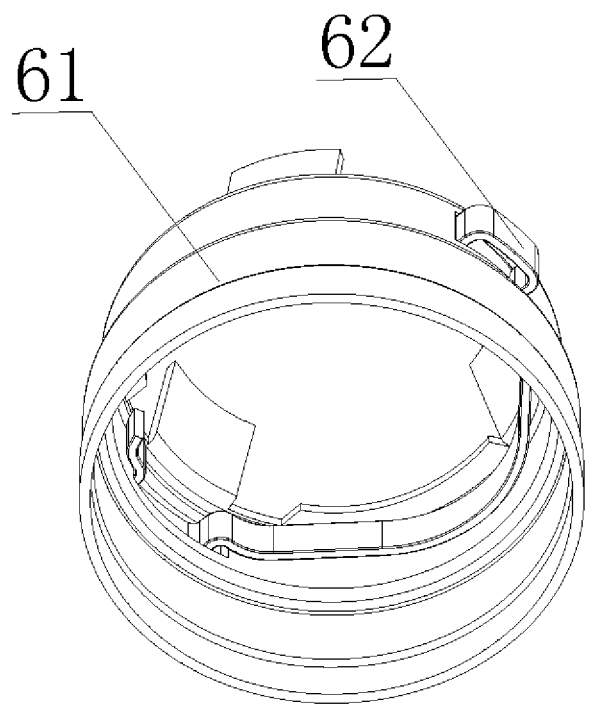
FIG. 6 illustrates a schematic structure diagram of a driving assembly according to some embodiments in the present disclosure.
Figure 7:
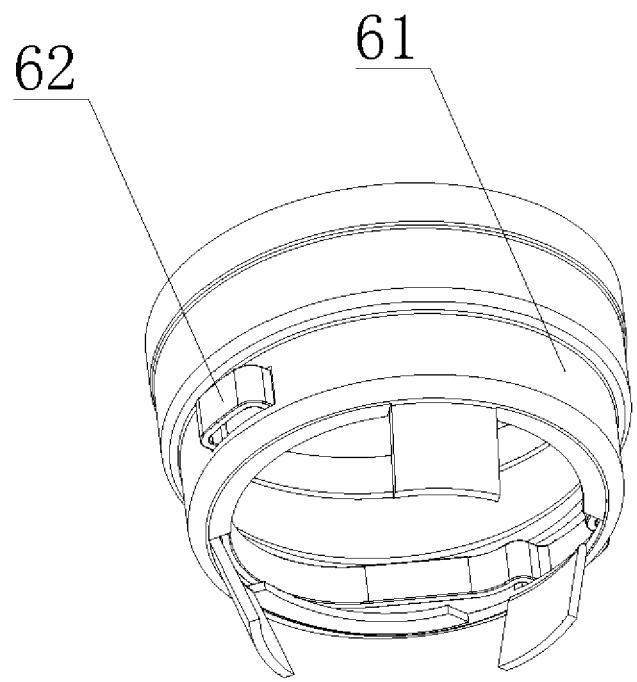
FIG. 7 illustrates a side view of a driving assembly according to some embodiments in the present disclosure.

As shown in FIG. 2 and FIG. 3, a pitch of a thread of the jaws 20 fitting the locking member 30 is T, and a number of teeth of the toothed structure is Z, $0.021 < T/Z \leq 0.03$. With this arrangement, an effect of preventing self-locking is better achieved by setting a reasonable number of teeth. When a number of teeth is small, a length of an inclined surface of each tooth is increased, or a gap between adjacent teeth is increased. In this way, when the drill chuck is drilling a hole and vibrates, although the housing 40 and the sleeve 61 move to a certain extent under an influence of vibration of the drill chuck, at this time, if the lengths of the second inclined surface and the fourth inclined surface are both disposed to be longer, the clamping structure is cooperated with the toothed structure to achieve a better effect of preventing self-locking, but if the clamping structure is in a middle of the second inclined surface or the fourth inclined surface at this time, and the clamping structure is not in a stable cooperation state, that is, an abutment of the clamping structure with the first inclined surface and the third inclined surface is not facilitated, so that an effect of stably preventing self-locking is not achieved.

In the present embodiments, the toothed structure is an external toothed structure, and the toothed structure is disposed on an outer wall of the drill body 10.

As shown in FIG. 4 to FIG. 7, in order to better drive a rotation of the locking member 30, the driving assembly in the present embodiments includes a sleeve 61 and an elastic member 62. The sleeve 61 is disposed in the housing 40, the sleeve 61 is sleeved on the outer side of the locking member 30, and the locking member 30 and the sleeve 61 are in interference fit so that the sleeve 61 can drive the locking member 30 to rotate. The elastic member 62 is disposed in the sleeve 61, and a part of the elastic member 62 is passed through the sleeve 61 and abutted against an inner wall of the housing 40. The elastic member 62 is provided with the clamping structure, and the housing 40 drives the locking member 30 to rotate by the sleeve 61.

Figure 8:
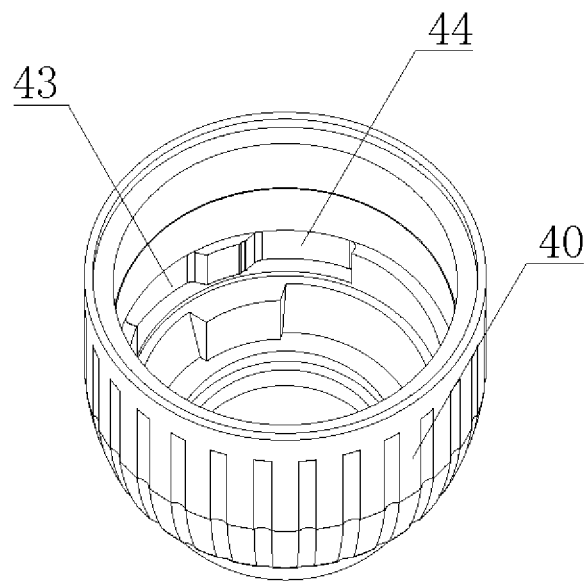
FIG. 8 illustrates a schematic structure diagram of a housing according to some embodiments in the present disclosure.

As shown in FIG. 8, an inner wall of the housing 40 is provided with a first groove 41, a second groove 42, a third groove 43, and a fourth groove 44 sequentially disposed in a circumferential direction. The first groove 41 is connected with the second groove 42 in a manner of a circular arc, a groove depth of the second groove 42 is less than a groove depth of the first groove 41, and the third groove 43 and the fourth groove 44 are spaced from each other. The sleeve 61 is provided with a first through hole and a second through hole, and the elastic member 62 has a first protrusion 621, a second protrusion 622 and a backstop piece 623. The first protrusion 621 is disposed in the first through hole, and the second protrusion 622 is disposed in the second through hole, so that the elastic member 62 can better drive the sleeve 61 to rotate. The backstop piece 623 forms the clamping structure. When the first protrusion 621 is disposed in the second groove 42 and the second protrusion 622 is disposed in the fourth groove 44, the clamping structure receives a force toward the toothed structure, and the clamping structure cooperates with the toothed structure to make the clamping structure at the first locking position. When the first protrusion 621 is disposed in the first groove 41 and the second protrusion 622 is disposed in the third groove 43, the clamping structure is at the first avoiding position. The first groove 41 and the second groove 42 in the present embodiments is connected by a circular arc segment.

Figure 9:
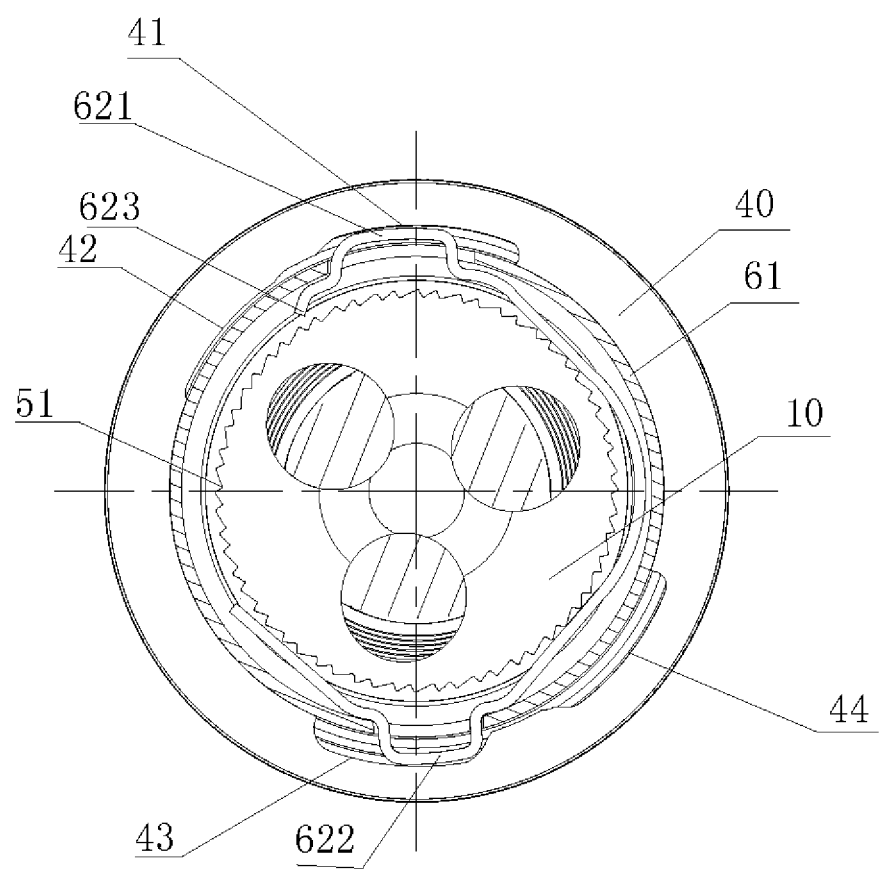
FIG. 9 illustrates a schematic structure diagram of a locking structure of a drill chuck having a first toothed structure in an avoiding state according to some embodiments in the present disclosure.
Figure 10:
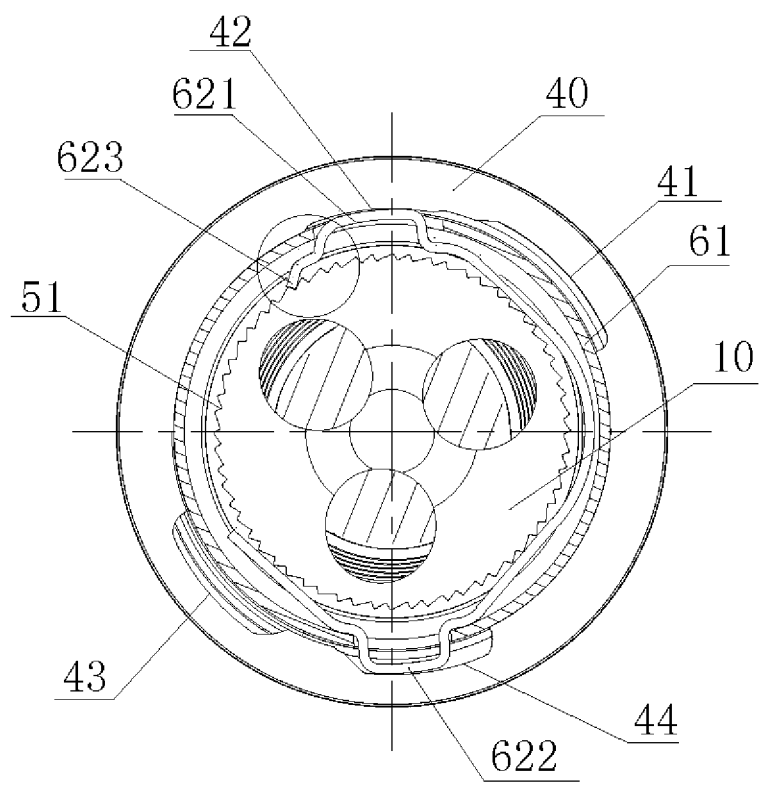
FIG. 10 illustrates a schematic structure diagram of a backstop piece abutting against a third inclined surface when a locking structure of a drill chuck having a first toothed structure is in an locking state according to some embodiments in the present disclosure.
Figure 11:
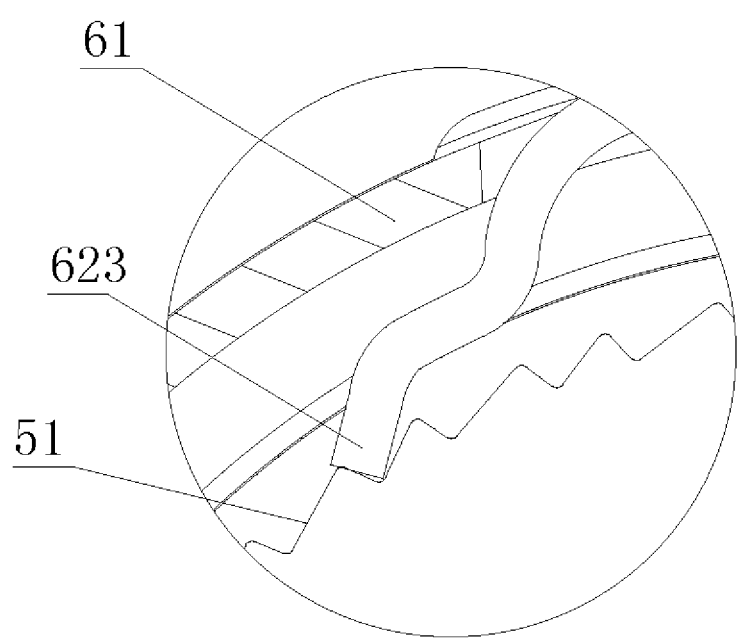
FIG. 11 illustrates a partial enlarged diagram of FIG. 10.

As shown in FIG. 9, the drill chuck is provided with a first toothed structure 51. When a drill bit is installed, the clamping structure is at the first avoiding position. When the housing 40 is screwed, the housing 40 drives the elastic member 62 to move while the sleeve 61 will drive the locking member 30 to rotate. As shown in FIG. 10 and FIG. 11, when the drill chuck has clamped the drill bit, the housing 40 continues to be screwed. When a torsion force received by the housing 40 is greater than a deformation force of the first protrusion 621, the first protrusion 621 moves from the first groove 41 to the second groove 42, and correspondingly, the second protrusion 622 moves from the third groove 43 to the fourth groove 44. At this time, the clamping structure is at the first locking position, so that a process of locking the drill bit is completed.

Figure 12:
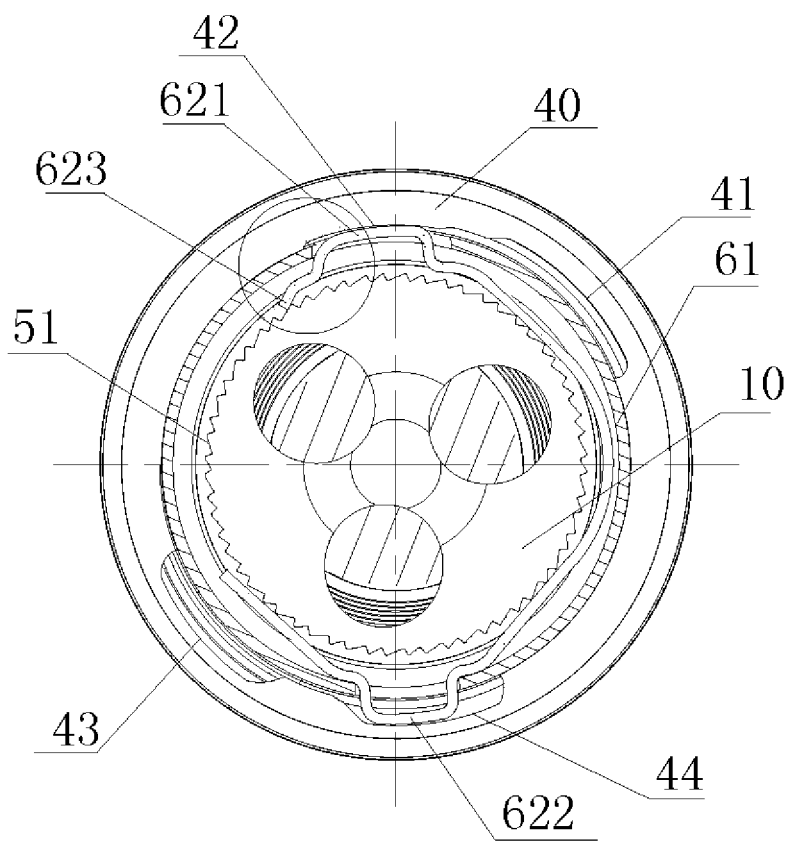
FIG. 12 illustrates a schematic structure diagram of a backstop piece at a fourth inclined surface when a locking structure of a drill chuck having a first toothed structure is at an locking state according to some embodiments in the present disclosure.
Figure 13:
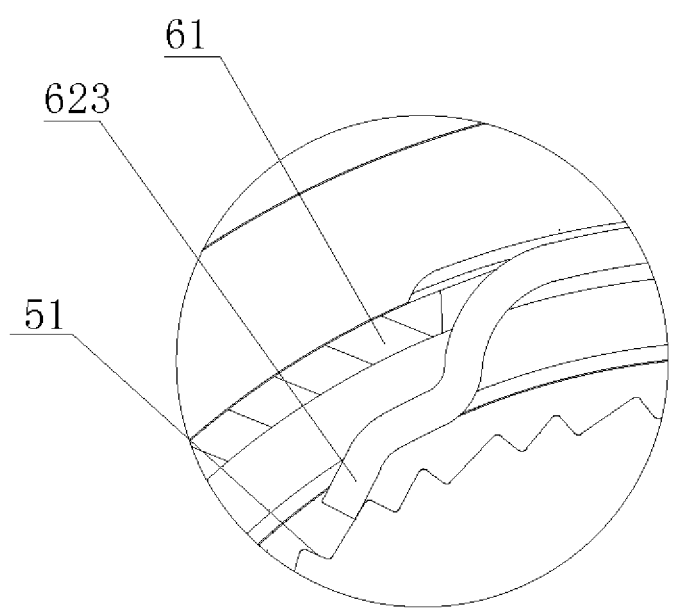
FIG. 13 illustrates a partial enlarged diagram of FIG. 12.

When the drill chuck with the first toothed structure 51 is used, and when the drill bit is working, the housing 40 moves due to an impact of vibration. A cooperation of the clamping structure and the toothed structure prevents the drill chuck from loosening and also prevents the drill chuck from self-locking. In some embodiments, the backstop piece 623 does not loosen under the abutting action of the first inclined surface and the third inclined surface. FIG. 10 and FIG. 11 illustrate schematic structure diagrams of the backstop piece 623 abutted against the third inclined surface. The backstop piece 623 does not self-lock under an action of the second inclined surface and the fourth inclined surface. FIG. 12 and FIG. 13 illustrate schematic structure diagrams of the backstop piece 623 located in a middle of the fourth inclined surface. Because the backstop piece 623 cannot cross the fourth inclined plane, an occurrence of self-locking is avoided, and an inconvenience of loosening the jaws 20 after self-locking is further avoided.

Figure 14:
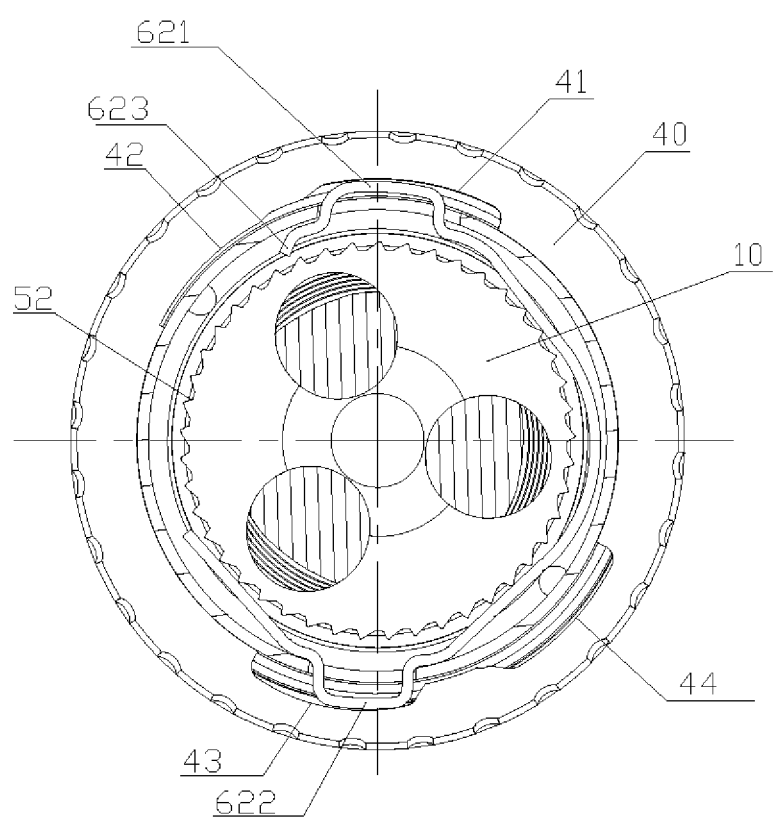
FIG. 14 illustrates a schematic structure diagram of a locking structure of a drill chuck having a second toothed structure in an avoiding state according to some embodiments in the present disclosure.
Figure 15:
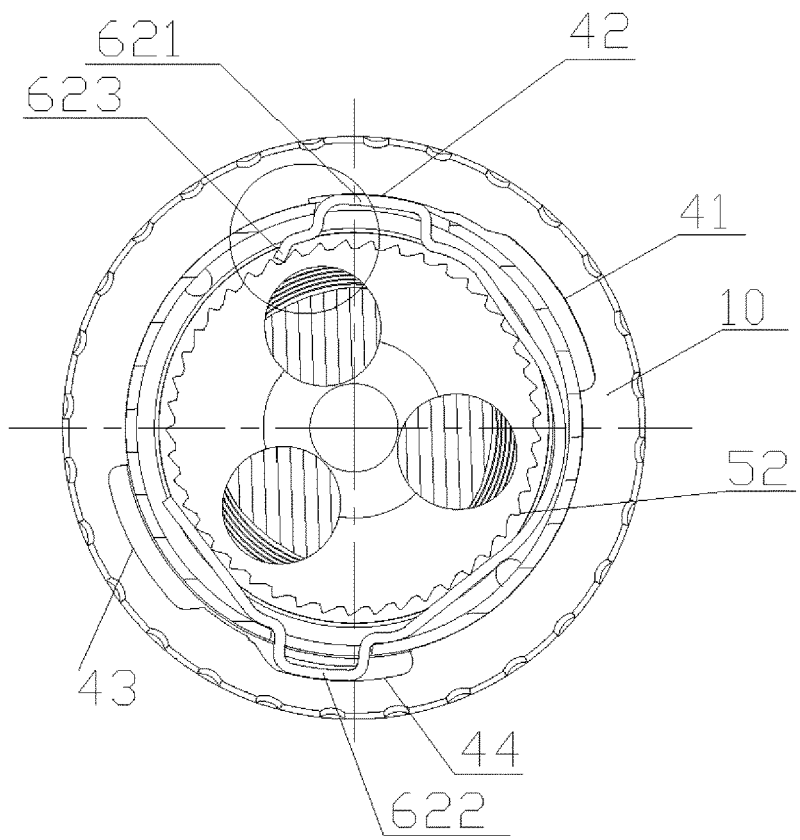
FIG. 15 illustrates a schematic structure diagram of a locking structure of a drill chuck having a second toothed structure in a locking state according to some embodiments in the present disclosure.
Figure 16:
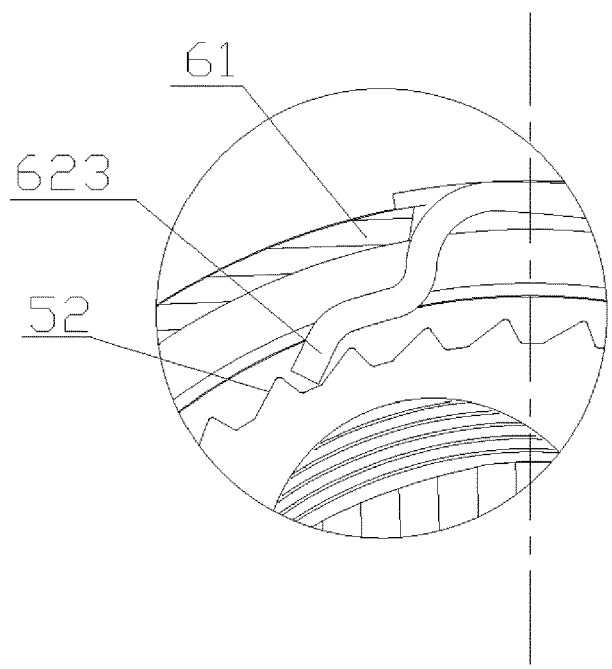
FIG. 16 illustrates a partial enlarged diagram of FIG. 15.

As shown in FIG. 14, the drill chuck includes a second toothed structure 52. When a drill bit is installed, the clamping structure is at the first avoiding position. When the housing 40 is screwed, the housing 40 drives the elastic member 62 to move while the sleeve 61 drives the locking member 30 to rotate. As shown in FIG. 15 and FIG. 16, when the drill chuck has clamped the drill bit, the housing 40 continues to be screwed. When the torsion force received by the housing 40 is greater than the deformation force of the first protrusion 621, the first protrusion 621 moves from the first groove 41 to the second groove 42, and correspondingly, the second protrusion 622 moves from the third groove 43 to the fourth groove 44. At this time, the backstop piece 623 will be located at a gap between two adjacent third teeth, and the clamping structure is at the first locking position, so that the process of locking the drill bit is completed.

When the drill chuck with the second toothed structure 52 is used, and when the drill bit is working, the housing 40 moves due to the impact of vibration. The cooperation of the clamping structure and the toothed structure prevents the drill chuck from loosening and also prevents the drill chuck from self-locking. In some embodiments, since the backstop piece 623 is disposed at the gap between two adjacent third teeth, when the housing 40 moves due to vibration, the backstop piece 623 will vibrate at the gap between two adjacent third teeth, but due to a blocking effect of the two adjacent third teeth, the backstop piece 623 is prevented from crossing the two adjacent third teeth, which further prevents the drill chuck from loosening or self-locking.

As shown in FIG. 24, FIG. 25, FIG. 26 and FIG. 27, the protruding portion 611 in the present embodiments is disposed on the sleeve 61, the clamping portion includes a clamping groove 46, and the clamping groove 46 is provided on the inner wall of the housing 40. An avoiding groove 45 is also provided on the inner wall of the housing 40, and the avoiding groove 45 and the clamping groove 46 are spaced from each other along an axial direction. When the clamping structure is at the first locking position, the protruding portion 611 is abutted against a groove wall of the clamping groove 46 so that the protruding portion 611 is at the second locking position, so as to prevent the drill chuck from self-locking or loosening during drilling. When the clamping structure is at the first avoiding position, the protruding portion 611 is located in the avoiding groove 45 so that the protruding portion 611 is at the second avoiding position. In some embodiments, along an axial direction of the inner wall of the housing 40, a groove width of the avoiding groove 45 is greater than a groove width of the clamping groove 46.

In the present embodiments, the drill chuck further includes a supporting member 70. The supporting member 70 is disposed in the housing 40 and located below the locking member 30, and the supporting member 70 is configured to support the locking member 30. The supporting member 70 in the present embodiments is a steel pad.

In order to make the locking member 30 rotate better, the drill chuck in the present embodiments further includes a bearing 80, and the bearing 80 is disposed in the housing 40 and located between the supporting member 70 and the locking member 30.

The drill chuck in the present embodiments further includes a rear cover 90, a front cover 100 and a clamp spring 110. One end of the rear cover 90 is connected with the housing 40, and the other end of the rear cover 90 is connected with the drill body 10. The front cover 100 is disposed at an end of the housing 40 far away from the rear cover. The front cover 100 is made of a metal material, which plays a role in protection and positioning.

Figure 17:
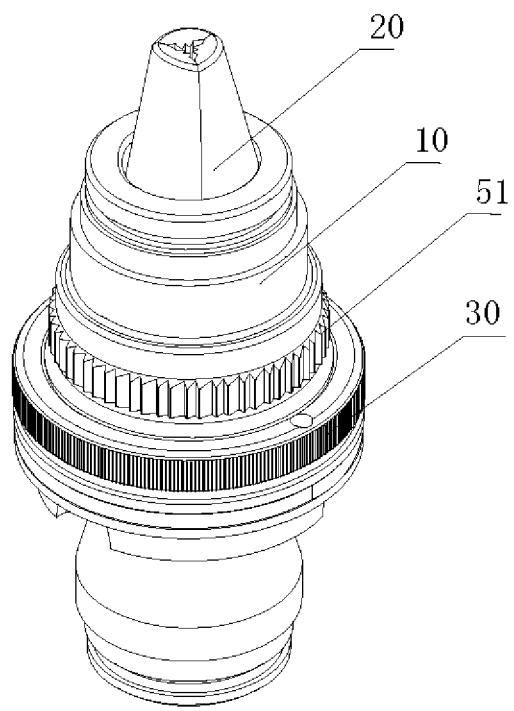
FIG. 17 illustrates a drill chuck with a first toothed structure disposed on one side away from a locking member and close to jaws according to some embodiments in the present disclosure.
Figure 18:
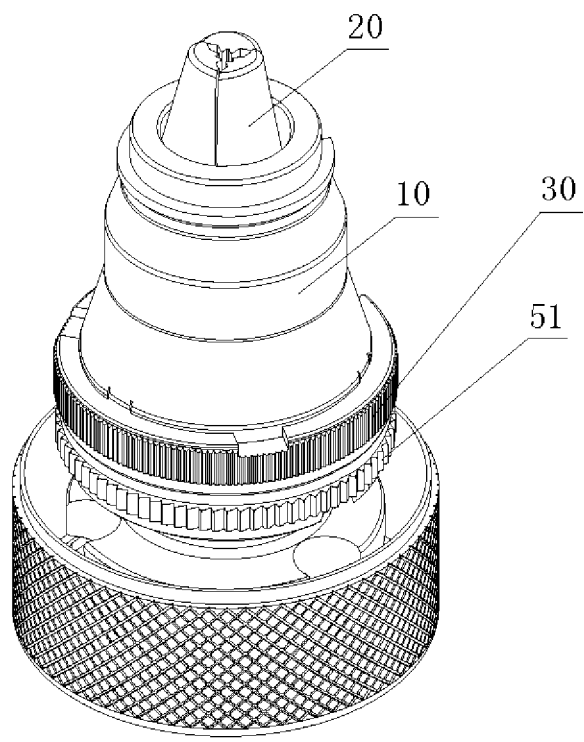
FIG. 18 illustrates a drill chuck with a first toothed structure disposed close to a locking member according to some embodiments in the present disclosure.
Figure 19:
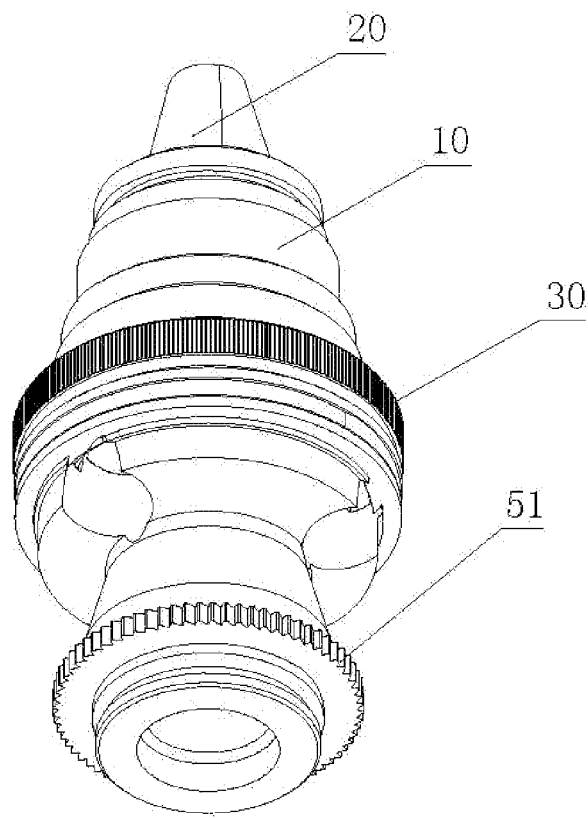
FIG. 19 illustrates a drill chuck with a first toothed structure disposed on one side away from a locking member and away from jaws according to some embodiments in the present disclosure.

In some embodiments, the toothed structure is disposed at different positions of the drill body 10 according to actual conditions to meet different usage requirements. FIG. 17 to FIG. 19 show the drill chuck having the first toothed structure 51. FIG. 17 to FIG. 19 respectively illustrate the first toothed structure 51 disposed at different positions of the drill body 10. FIG. 17 illustrates a situation where the first toothed structure 51 is disposed on one side away from the locking member 30 and close to the jaws 20. FIG. 18 illustrates a situation where the first toothed structure is disposed close to the locking member. FIG. 19 illustrates a situation where the first toothed structure 51 is disposed on one side away from the locking member 30 and away from the jaws 20.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

Unless otherwise specified, relative arrangements of assemblies and steps elaborated in these embodiments, numeric expressions and numeric values do not limit the scope of the disclosure. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discuss the certain item in the subsequent drawings.

In the descriptions of the disclosure, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the disclosure and to simplify the descriptions without indicating or impliedly indicating that the referring device or element must have a specific location and must be constructed and operated with the specific location, and accordingly it cannot be understood as limitations to the disclosure. The nouns of locality "inner and outer" refer to the inner and outer contours of each assembly.

For ease of description, spatial relative terms such as "over", "above", "on an upper surface" and "upper" are used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" includes two orientations namely "above" and "below". The device may be located in other different modes (rotated by 90 degrees or located in other orientations), and spatial relative descriptions used herein are correspondingly explained.

In addition, it is to be noted that terms "first", "second" and the like are used to limit parts, and are only intended to distinguish corresponding parts. If there are no otherwise statements, the above terms do not have special meanings, such that they cannot be understood as limits to the scope of protection of the disclosure.

The above is only the preferred embodiments of the disclosure, not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. A drill chuck, comprising:
   a drill body;
   jaws, partially disposed in the drill body, the jaws being movably disposed in the drill body to realize clamping and unclamping, and external threads being provided on an outer wall of the jaws;
   a locking member, the locking member being disposed on an outer side of the drill body, the locking member being provided with internal threads, and the locking member and the jaws being in threaded fit to enable the jaws to be movably disposed in the drill body;
   a driving assembly, disposed on an outer side of the locking member, the driving assembly being configured to drive the locking member to rotate;
   a housing, the drill body, the jaws, the locking member and the driving assembly being disposed in the housing, the driving assembly being disposed between the housing and the locking member, and the housing driving the locking member to rotate by the driving assembly to enable the jaws to move in the drill body; and
   a locking structure, disposed in the housing, the locking structure being located between the housing and the jaws, the locking structure having a locking state and an avoiding state, wherein when the locking structure is in the locking state, the locking structure is configured to restrict the driving assembly from driving the jaws to move so as to prevent the jaws from further clamping or unclamping;

wherein the locking structure comprises a toothed structure and a clamping structure, the clamping structure is disposed on the driving assembly, the clamping structure has a first locking position and a first avoiding position, when the locking structure is in the locking state, the clamping structure is at the first locking position to cooperate with the toothed structure to restrict the driving assembly to rotate, and when the locking structure is in the avoiding state, the clamping structure is at the first avoiding position to enable the driving assembly to smoothly drive the locking member to rotate;

wherein the locking structure further comprises a protruding portion and a clamping portion, the protruding portion is disposed on the driving assembly, the protruding portion and the clamping structure are spaced from each other, the protruding portion has a second locking position and a second avoiding position, when the locking structure is in the locking state, the protruding portion is at the second locking position to cooperate with the clamping portion to restrict the driving assembly to rotate, and when the locking structure is in the avoiding state, the protruding portion is at the second avoiding position to enable the driving assembly to smoothly drive the locking member to rotate;

wherein the toothed structure comprises:

a first toothed structure, the first toothed structure comprising a plurality of first toothed units, the first toothed unit comprising a first tooth and a second tooth, the first tooth having a first inclined surface and a second inclined surface, the second tooth having a third inclined surface and a fourth inclined surface, the first inclined surface, the second inclined surface, the third inclined surface and the fourth inclined surface being connected in sequence, and a length of the fourth inclined surface being greater than a length of the second inclined surface.

2. The drill chuck according to claim 1, wherein a pitch of a thread of the jaws fitting the locking member is T, and a number of teeth of the toothed structure is Z, $0.021 < T/Z \leq 0.03$.

3. The drill chuck according to claim 1, wherein the toothed structure is an external toothed structure, and the toothed structure is disposed on an outer wall of the drill body.

4. The drill chuck according to claim 3, wherein the driving assembly comprises:

a sleeve, disposed in the housing, the sleeve being sleeved on the outer side of the locking member, and the locking member and the sleeve being in interference fit; and an elastic member, disposed in the sleeve, a part of the elastic member being passed through the sleeve and abutted against an inner wall of the housing, the elastic member being provided with the clamping structure, and the housing driving the locking member to rotate by the sleeve.

5. The drill chuck according to claim 4, wherein an inner wall of the housing is provided with a first groove, a second groove, a third groove, and a fourth groove sequentially disposed in a circumferential direction, the first groove is connected with the second groove in a manner of a circular arc, a groove depth of the second groove is less than a groove depth of the first groove, the third groove and the fourth groove are spaced from each other, the sleeve is provided with a first through hole and a second through hole, the elastic member has a first protrusion, a second protrusion and a backstop piece, the first protrusion is disposed in the first through hole, the second protrusion is disposed in the second through hole, the backstop piece forms the clamping structure, when the first protrusion is disposed in the second groove and the second protrusion is disposed in the fourth groove, the clamping structure is at the first locking position, and when the first protrusion is disposed in the first groove and the second protrusion is disposed in the third groove, the clamping structure is at the first avoiding position.

6. The drill chuck according to claim 5, wherein the protruding portion is disposed on the sleeve, the clamping portion comprises a clamping groove, the clamping groove is provided on the inner wall of the housing, the inner wall of the housing is also provided with an avoiding groove, the avoiding groove and the clamping groove are spaced from each other along an axial direction, when the clamping structure is at the first locking position, the protruding portion is abutted against a groove wall of the clamping groove so that the protruding portion is at the second locking position, and when the clamping structure is at the first avoiding position, the protruding portion is located in the avoiding groove so that the protruding portion is at the second avoiding position.

7. A drill chuck, comprising:

a drill body;

jaws, partially disposed in the drill body, the jaws being movably disposed in the drill body to realize clamping and unclamping, and external threads being provided on an outer wall of the jaws;

a locking member, the locking member being disposed on an outer side of the drill body, the locking member being provided with internal threads, and the locking member and the jaws being in threaded fit to enable the jaws to be movably disposed in the drill body;

a driving assembly, disposed on an outer side of the locking member, the driving assembly being configured to drive the locking member to rotate;

a housing, the drill body, the jaws, the locking member and the driving assembly being disposed in the housing, the driving assembly being disposed between the housing and the locking member, and the housing driving the locking member to rotate by the driving assembly to enable the jaws to move in the drill body; and a locking structure, disposed in the housing, the locking structure being located between the housing and the jaws, the locking structure having a locking state and an avoiding state, wherein when the locking structure is in the locking state, the locking structure is configured to restrict the driving assembly from driving the jaws to move so as to prevent the jaws from further clamping or unclamping;

wherein the locking structure comprises a toothed structure and a clamping structure, the clamping structure is disposed on the driving assembly, the clamping structure has a first locking position and a first avoiding position, when the locking structure is in the locking state, the clamping structure is at the first locking position to cooperate with the toothed structure to restrict the driving assembly to rotate, and when the locking structure is in the avoiding state, the clamping structure is at the first avoiding position to enable the driving assembly to smoothly drive the locking member to rotate;

wherein the locking structure further comprises a protruding portion and a clamping portion, the protruding portion is disposed on the driving assembly, the protruding portion and the clamping structure are spaced from each other, the protruding portion has a second locking position and a second avoiding position, when the locking structure is in the locking state, the protruding portion is at the second locking position to cooperate with the clamping portion to restrict the driving assembly to rotate, and when the locking structure is in the avoiding state, the protruding portion is at the second avoiding position to enable the driving assembly to smoothly drive the locking member to rotate;

wherein the toothed structure comprises:

a second toothed structure, the second toothed structure comprising a plurality of third teeth, a gap is disposed between two adjacent third teeth;

wherein a pitch of a thread of the jaws fitting the locking member is T, and a number of teeth of the toothed structure is Z, $0.021 < T/Z \leq 0.03$.

8. The drill chuck according to claim 7, wherein the toothed structure is an external toothed structure, and the toothed structure is disposed on an outer wall of the drill body.

9. The drill chuck according to claim 8, wherein the driving assembly comprises:

a sleeve, disposed in the housing, the sleeve being sleeved on the outer side of the locking member, and the locking member and the sleeve being in interference fit; and an elastic member, disposed in the sleeve, a part of the elastic member being passed through the sleeve and abutted against an inner wall of the housing, the elastic member being provided with the clamping structure, and the housing driving the locking member to rotate by the sleeve.

10. The drill chuck according to claim 9, wherein an inner wall of the housing is provided with a first groove, a second groove, a third groove, and a fourth groove sequentially disposed in a circumferential direction, the first groove is connected with the second groove in a manner of a circular arc, a groove depth of the second groove is less than a groove depth of the first groove, the third groove and the fourth groove are spaced from each other, the sleeve is provided with a first through hole and a second through hole, the elastic member has a first protrusion, a second protrusion and a backstop piece, the first protrusion is disposed in the first through hole, the second protrusion is disposed in the second through hole, the backstop piece forms the clamping structure, when the first protrusion is disposed in the second groove and the second protrusion is disposed in the fourth groove, the clamping structure is at the first locking position, and when the first protrusion is disposed in the first groove and the second protrusion is disposed in the third groove, the clamping structure is at the first avoiding position.

11. The drill chuck according to claim 10, wherein the protruding portion is disposed on the sleeve, the clamping portion comprises a clamping groove, the clamping groove is provided on the inner wall of the housing, the inner wall of the housing is also provided with an avoiding groove, the avoiding groove and the clamping groove are spaced from each other along an axial direction, when the clamping structure is at the first locking position, the protruding portion is abutted against a groove wall of the clamping groove so that the protruding portion is at the second locking position, and when the clamping structure is at the first avoiding position, the protruding portion is located in the avoiding groove so that the protruding portion is at the second avoiding position.

* * * * *